US009043375B2

(12) United States Patent
Zeidman et al.

(10) Patent No.: US 9,043,375 B2
(45) Date of Patent: May 26, 2015

(54) SEARCHING THE INTERNET FOR COMMON ELEMENTS IN A DOCUMENT IN ORDER TO DETECT PLAGIARISM

(75) Inventors: Robert Marc Zeidman, Cupertino, CA (US); Timothy Douglas Hoehn, Coupeville, WA (US)

(73) Assignee: Software Analysis and Forensic Engineering Corporation, Cupertino, CA (US)

( * ) Notice: Subject to any disclaimer, the term of this patent is extended or adjusted under 35 U.S.C. 154(b) by 1248 days.

(21) Appl. No.: 12/253,249

(22) Filed: Oct. 17, 2008

(65) Prior Publication Data

US 2010/0114924 A1    May 6, 2010

(51) Int. Cl.
G06F 7/00 (2006.01)
G06F 17/00 (2006.01)
G06F 17/30 (2006.01)

(52) U.S. Cl.
CPC ................................ G06F 17/30657 (2013.01)

(58) Field of Classification Search
CPC ................... G06F 17/30684; G06F 17/30687; G06F 17/30864
USPC ........... 707/802, 783, 102; 717/177; 715/205; 726/21, 26; 709/205; 342/357.09
See application file for complete search history.

(56) References Cited

U.S. PATENT DOCUMENTS

| | | | |
|---|---|---|---|
| 6,052,693 A * | 4/2000 | Smith et al. ............................ 1/1 |
| 6,081,814 A * | 6/2000 | Mangat et al. ................ 715/205 |
| 6,282,698 B1 * | 8/2001 | Baker et al. .................... 717/118 |
| 6,285,999 B1 | 9/2001 | Page |
| 6,630,949 B1 * | 10/2003 | Yamagishi ............... 348/207.99 |
| 6,658,423 B1 | 12/2003 | Pugh |
| 6,976,170 B1 | 12/2005 | Kelly |
| 7,139,756 B2 | 11/2006 | Cooper |
| 7,356,188 B2 * | 4/2008 | Venkatesan et al. .......... 382/229 |
| 7,366,718 B1 | 4/2008 | Pugh |
| 7,421,155 B2 * | 9/2008 | King et al. .................... 382/312 |
| 7,503,035 B2 * | 3/2009 | Zeidman ....................... 717/123 |
| 7,882,143 B2 * | 2/2011 | Smyros et al. ................ 707/802 |
| 8,146,156 B2 * | 3/2012 | King et al. ....................... 726/21 |
| 8,312,553 B2 * | 11/2012 | Rowney et al. ................. 726/26 |
| 8,479,161 B2 * | 7/2013 | Weigert ........................ 717/124 |
| 8,510,312 B1 * | 8/2013 | Thibaux et al. ............... 707/748 |
| 2005/0114840 A1 | 5/2005 | Zeidman |
| 2006/0005166 A1 | 1/2006 | Atkin |

(Continued)

OTHER PUBLICATIONS

Zeidman, B. and Baer, N., "What, Exactly, Is Software Trade Secret Theft?" Intellectual Property Today, Mar. 2008.

(Continued)

*Primary Examiner* — Susan Chen
(74) *Attorney, Agent, or Firm* — Blakely, Sokoloff, Taylor & Zafman LLP

(57) ABSTRACT

A method and system for detecting plagiarism of software source code is disclosed. In one embodiment, a database exists of program elements that have previously been found to be matching within the source code for two different programs. This embodiment searches the Internet for occurrences of these matching program elements to determine how many times they appear and thus whether they are commonly used or not. The elements and their associated number of hits are placed in a spreadsheet for further observation and manipulation. One of skill in the art will see that this invention also applies to other kinds of text documents.

15 Claims, 13 Drawing Sheets

(56) References Cited

U.S. PATENT DOCUMENTS

| | | | |
|---|---|---|---|
| 2008/0077570 A1* | 3/2008 | Tang et al. | 707/5 |
| 2008/0091708 A1* | 4/2008 | Caldwell | 707/102 |
| 2008/0162478 A1* | 7/2008 | Pugh et al. | 707/6 |
| 2008/0263036 A1* | 10/2008 | Yamamoto | 707/6 |
| 2008/0276234 A1* | 11/2008 | Taylor et al. | 717/177 |
| 2009/0222440 A1* | 9/2009 | Hantke et al. | 707/5 |
| 2009/0240735 A1* | 9/2009 | Grandhi et al. | 707/104.1 |
| 2010/0171654 A1* | 7/2010 | Millard et al. | 342/357.09 |
| 2011/0099638 A1* | 4/2011 | Jones et al. | 726/26 |
| 2011/0179119 A1* | 7/2011 | Penn | 709/205 |
| 2012/0166458 A1 | 6/2012 | Laudanski et al. | |
| 2012/0166485 A1* | 6/2012 | Tashiro et al. | 707/783 |

OTHER PUBLICATIONS

Michael J. Wise, YAP3: Improved detection of similarities in computer program and other texts, SIGCSE '96, Philadelphia, PA, USA, Feb. 15-17, pp. 130-134, 1996.

Zeidman, Bob, "Detecting Source-Code Plagiarism," Dr. Dobb's Journal, Jul. 2004, pp. 55-60.

Clough, P.: "Plagiarism in natural and programming languages: an overview of current tools and technologies," Memoranda, CS-00-05, Comp Sci, University of Sheffield, UK, 2000.

Langville, A. N. & Meyer, C. D.: "Deeper inside PageRank," Internet Mathematics, 1(3), 335-400, 2005.

Robert Zeidman, Iterative Filtering of Retrieved Information to Increase Relevance, The 11th World Multi-Conference on Systemics, Cybernetics and Informatics: WMSCI 2007.

Lutz Prechelt, Guido Malpohl, Michael Philippsen, Finding Plagiarisms among a Set of Programs with JPlag, J. of Universal Computer Science, vol. 8, No. 11, pp. 1016-1038, 2002.

Saul Schleimer, Daniel Wilkerson, Alex Aiken, Winnowing: Local Algorithms for Document Fingerprinting, SIGMOD 2003, San Diego, CA, USA, Jun. 9-12, 2003.

Zeidman, R., "Multidimensional Correlation of Software Source Code," The Third International Workshop on Systematic Approaches to Digital Forensic Engineering, May 22, 2008.

Stephen Shankland, "Palamida startup to search source code for open source code," http://news.zdnet.com/2100-3513_22-5576201.html.

Zeidman, B., "Software Source Code Correlation," 5th IEEE/ACIS International Conference on Computer and Information Science, Jul. 12, 2006.

Zeidman, B., "What, Exactly, Is Software Plagiarism?" Intellectual Property Today, Feb. 2007.

* cited by examiner

```
She loves you yeah, yeah, yeah.  ──┤ 501
```

Figure 5A prior art

```
shelo helov elove loves ovesy vesyo esyou syouy youye
ouyea uyeah yeahy eahye ahyea hyeah yeahy eahye ahyea
hyeah
                                        ──┤ 502
```

```
/*   ---- begin    routine ----   */
void fdiv(
    char    *fname,    // file name
    char *path)        // path
{
    int Index1, j;                    ──┤ 601
    printf("hello world");
    while (1)
        j =   strlen(fname);
    /* find the file    extension */
```

Figure 6A prior art

```
SourceLines1[0] = "void fdiv"              CommentLines1[0] = "---- begin routine ----"
SourceLines1[1] = "char fname"             CommentLines1[1] = "file name"
SourceLines1[2] = "char path"              CommentLines1[2] = "path"
SourceLines1[3] = "int Index1 j"           CommentLines1[3] = "hello world"
SourceLines1[4] = "while 1"                CommentLines1[4] = "find the file extension"
SourceLines1[5] = "j strlen fname"
                            | 602                              | 603
```

Figure 6B prior art

```
Word1[0] = "fdiv"
Word1[1] = "fname"          | 604
Word1[2] = "path"
Word1[3] = "Index1"
```

Figure 6C prior art

| Internet Search Results |  |
|---|---|
| Run date | 12/23/2007 |
| Analysis date | 2/14/2008 |
|  |  |
| Statements | Hits |
| abc | 626,000,000 |
| Author: Robert Zeidman | 4 |
| Comment: fix this code later | 0 |
| for (i = 0; i < NumLines; i++); | 0 |
| hello world! | 26,800,000 |
| i | 18,600,000,000 |
| if (n == NumLines) | 5 |
| Index1 | 36,600,000 |
| NumLines | 133,000 |
| wait for user response | 3,850 |

Figure 11

SEARCHING THE INTERNET FOR COMMON ELEMENTS IN A DOCUMENT IN ORDER TO DETECT PLAGIARISM

BACKGROUND OF THE INVENTION

1. Field of the Invention

The present invention relates to software tools for comparing text files to determine the amount of similarity between the files. In particular, the present invention relates to searching the Internet to determine the frequency of usage of terms that are common between two programs in order to determine whether the files that have been copied or derived, in full or in part, from each other or from a common third file.

2. Discussion of the Related Art

Software plagiarism detection programs and algorithms have been around for a number of years but have gotten more attention recently due to two main factors. One reason is that the Internet and search engines like Google have made source code very easy to obtain. Another reason is the growing open source movement that allows programmers all over the world to write, distribute, and share code. It follows that plagiarism detection programs have become more sophisticated in recent years. An excellent summary of available tools is given by Paul Clough in his paper, "Plagiarism in natural and programming languages: an overview of current tools and technologies." Clough discusses tools and algorithms for finding plagiarism in generic text documents as well as in programming language source code files. Following are brief descriptions of prior art consisting of four of the most popular tools and their algorithms.

The prior art Plague program was developed by Geoff Whale at the University of New South Wales. Plague uses an algorithm that creates what is called a structure-metric, based on matching code structures rather than matching the code itself. The idea is that two pieces of source code that have the same structures are likely to have been copied. The Plague algorithm ignores comments, variable names, function names, and other elements that can easily be globally or locally modified in an attempt to fool a plagiarism detection tool.

Plague has three phases to its detection, as illustrated in FIG. 1:

In the first phase 101, a sequence of tokens and structure metrics are created to form a structure profile for each source code file. In other words, each program is boiled down to basic elements that represent control structures and data structures in the program.

In the second phase 102, the structure profiles are compared to find similar code structures. Pairs of files with similar code structures are moved into the next stage.

In the final stage 103, token sequences within matching source code structures are compared using a variant of the Longest Common Subsequence (LCS) algorithm to find similarity.

The prior art YAP programs (YAP, YAP2, and YAP3) were developed by Michael Wise at the University of Sydney, Australia. YAP stands for "Yet Another Plague" and is an extension of Plague. All three version of YAP use algorithms, illustrated in FIG. 2, that can generally be described in two phases as follows:

In the first phase 201, generate a list of tokens for each source code file.

In the second phase 202, compare pairs of token files.

The first phase of the algorithm is identical for all three programs. The steps of this phase, illustrated in FIG. 2, are:

In step 203 remove comments and string constants.

In step 204 translate upper-case letters to lower-case.

In step 205, map synonyms to a common form. In other words, substitute a basic set of programming language statements for common, nearly equivalent statements. As an example using the C language, the language keyword "strncmp" would be mapped to "strcmp", and the language keyword "function" would be mapped to "procedure".

In step 206, reorder the functions into their calling order. The first call to each function is expanded inline and tokens are substituted appropriately. Each subsequent call to the same function is simply replaced by the token FUN.

In step 207, remove all tokens that are not specifically programming language keywords.

The second phase 202 of the algorithm is identical for YAP and YAP2. YAP relied on the sdiff function in UNIX to compare lists of tokens for the longest common sequence of tokens. YAP2, implemented in Perl, improved performance in the second phase 202 by utilizing a more sophisticated algorithm known as Heckel's algorithm. One limitation of YAP and YAP2 that was recognized by Wise was difficulty dealing with transposed code. In other words, functions or individual statements could be rearranged to hide plagiarism. So for YAP3, the second phase uses the Running-Karp-Rabin Greedy-String-Tiling (RKR-GST) algorithm that is more immune to tokens being transposed.

The prior art JPlag is a program, written in Java by Lutz Prechelt and Guido Malpohl of the University Karlsruhe and Michael Philippsen of the University of Erlangen-Nuremberg, to detect plagiarism in Java, Scheme, C, or C++ source code. Like other plagiarism detection programs, JPlag works in phases as illustrated in FIG. 3:

There are two steps in the first phase 301. In the first step 303, whitespace, comments, and identifier names are removed. As with Plague and the YAP programs, in the second step 304, the remaining language statements are replaced by tokens.

As with YAP3, the method of Greedy String Tiling is used to compare tokens in different files in the second phase 302. A larger number of matching tokens corresponds to a higher degree of similarity and a greater chance of plagiarism.

The prior art Measure of Software Similarity (MOSS) program was developed at the University of California at Berkeley by Alex Aiken. MOSS uses a winnowing algorithm. The MOSS algorithm can be described by these steps, as illustrated in FIG. 4:

In the first step 401, remove all whitespace and punctuation from each source code file and convert all characters to lower case.

In the second step 402, divide the remaining non-whitespace characters of each file into k-grams, which are contiguous substrings of length k, by sliding a window of size k through the file. In this way the second character of the first k-gram is the first character of the second k-gram and so on.

In the third step 403, hash each k-gram and select a subset of all k-grams to be the fingerprints of the document. The fingerprint includes information about the position of each selected k-gram in the document.

In the fourth step 404, compare file fingerprints to find similar files.

An example of the algorithm for creating these fingerprints is shown in FIG. 5. Some text to be compared 501 is shown in FIG. 5A. The 5-grams 502 derived from the text 501 are shown in FIG. 5B. A possible sequence of hashes 503 is shown in FIG. 5C. A possible selection of hashes 504 chosen to be the fingerprint for the text 501 is shown in FIG. 5D. The concept is that the hash function is chosen so that the probability of collisions is very small so that whenever two documents share fingerprints, it is extremely likely that they share k-grams as well and thus contain plagiarized code.

The prior art CodeMatch® program (CodeSuite is a registered trademark of Software Analysis & Forensic Engineering Corporation) was developed by Robert Zeidman and is sold by Software Analysis & Forensic Engineering Corporation. CodeMatch corrects many, if not all, of the deficiencies noted in the previous program. Initially CodeMatch divides the source code files for two different programs into lists of basic elements consisting of statements, comments, strings, and identifiers as shown in FIG. 6. A snippet of source code 601 is shown in FIG. 6A. The statement list 602 derived from the source code 601 is shown in FIG. 6B. The comment/string list 603 derived from the source code 601 is shown in FIG. 6B. The identifier list 604 derived from the source code 601 is shown in FIG. 6C.

CodeMatch then uses the method illustrated in FIG. 7 to calculate a correlation between the two sets of files. In the first step 701, the statement, comment and string, and identifier lists for the two files to be compared are created. In the second step 702, the statement lists of the two files are compared using a statement matching algorithm. In the third step 703, the comment and string lists of the two files are compared using a comment and string matching algorithm. In the fourth step 704, the identifier lists of the two files are compared using an identifier matching algorithm. In the fifth step 705, the identifier lists of the two files are compared using a partial identifier matching algorithm. In the sixth step 706, the statement lists of the two files are compared using a statement sequence matching algorithm. Although all matching algorithms produce output for the user, in the seventh step 707, the results of all matching algorithms are combined into a single correlation score.

All of these prior art methods identify possibly plagiarized computer code, but rely on subjective determinations about whether or not plagiarism actually occurred. Finding a correlation between the source code files for two different programs does not necessarily mean that plagiarism occurred. It has been determined that there are exactly six reasons for correlation between the source code for two different programs. These reasons can be summarized as follows.

Third-Party Source Code. It is possible that widely available open source code is used in both programs. Also, libraries of source code can be purchased from third-party vendors. If two different programs use the same third-party code, the programs will be correlated.

Code Generation Tools. Automatic code generation tools, such as Microsoft Visual Basic or Adobe Dreamweaver, generate software source code that looks very similar with similar and often identical elements. The structure of the code generated by these tools tends to fit into specific templates with identifiable patterns. Two different programs that were developed using the same code generation tool will be correlated.

Commonly Used Identifier Names. Certain identifier names are commonly taught in schools or commonly used by programmers in certain industries. For example, the identifier result is often used to hold the result of an operation. These identifiers will be found in many unrelated programs and will result in these programs being correlated.

Common Algorithms. An algorithm is a procedure or a set of instructions for accomplishing some task. In one programming language there may be an easy or well-understood way of writing a particular algorithm that most programmers use. For example there might be a way to alphabetically sort a list of names. Perhaps this algorithm is taught in most programming classes at universities or is found in a popular programming textbook. These commonly used algorithms will show up in many different programs, resulting in a high degree of correlation between the programs even though there was no direct contact between the programmers.

Common Author. It is possible that one programmer, or "author," will create two programs that have correlation simply because that programmer tends to write code in a certain way. This is the programmer's style of coding. Thus two programs written by the same programmer can be correlated due to the style being similar even though there was no copying and the functionality of each program is different than that of the other.

Copied Code (Authorized or Plagiarized). Code was copied from one program to another, causing the programs to be correlated. The copying may have taken place for only certain sections of the code and may include small or significant changes to the code. When each of the previous reasons for correlation has been eliminated, the reason that remains is copying. If the copying was not authorized by the original owner, then it comprises plagiarism.

A useful tool is one that can help determine whether correlation is due to any of these factors in order to determine whether plagiarism occurred.

SUMMARY OF THE INVENTION

Plagiarism of software code is a serious problem in two distinct areas of endeavor these days—cheating by students at schools and intellectual property theft at corporations. A number of methods have been implemented to check source code files for plagiarism, each with their strengths and weaknesses. All of the previous methods identify possibly plagiarized source code and rely on subjective determinations about whether or not plagiarism actually occurred. In particular, identical program elements (statements, strings, comments, identifiers, instruction sequences, etc.) between two different programs may occur for reasons other than plagiarism. They may simply occur, for example, because these program elements are commonly used by programmers or are common terms in the industry for which the programs were written. The present invention searches the Internet for occurrences of the identical program elements to determine how many times they appear and thus whether they are in fact commonly used or not.

Further features and advantages of various embodiments of the present invention are described in the detailed description below, which is given by way of example only.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

FIG. 5 illustrates the prior art fingerprinting algorithm used by the MOSS program for source code plagiarism detection.

FIG. 6 illustrates prior art dividing a file of source code into statements, comments and strings, and identifiers.

FIG. 11 illustrates an example of a spreadsheet generated by one embodiment of the present invention.

DETAILED DESCRIPTION

Figure 1:
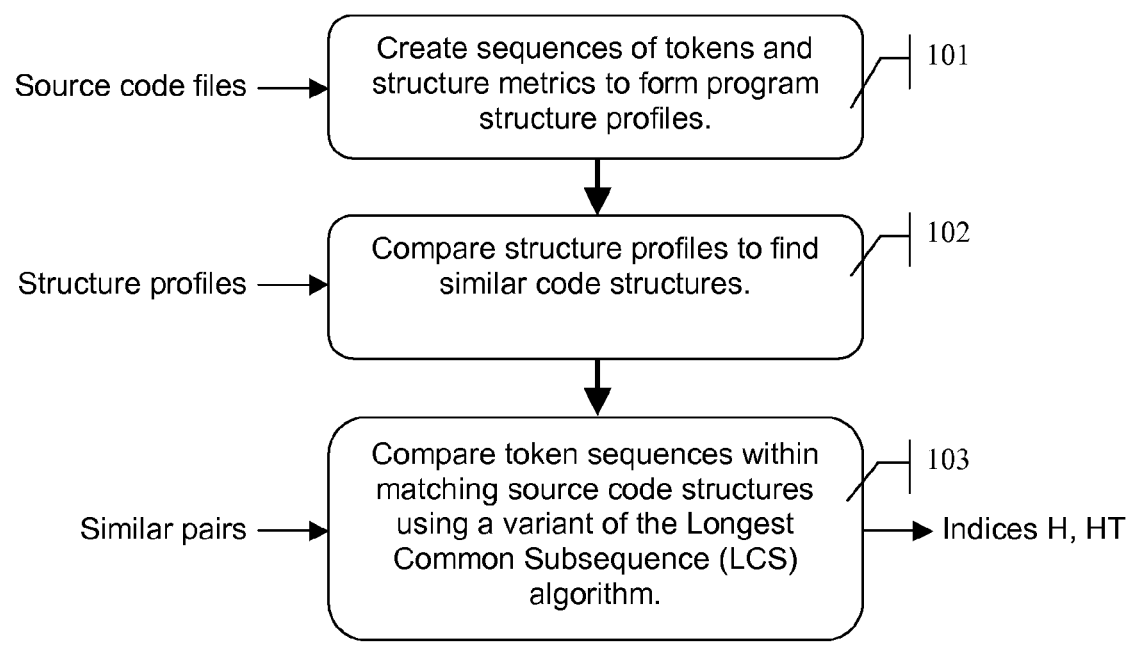
FIG. 1 illustrates the prior art algorithm used by the Plague program for source code plagiarism detection.
Figure 2:
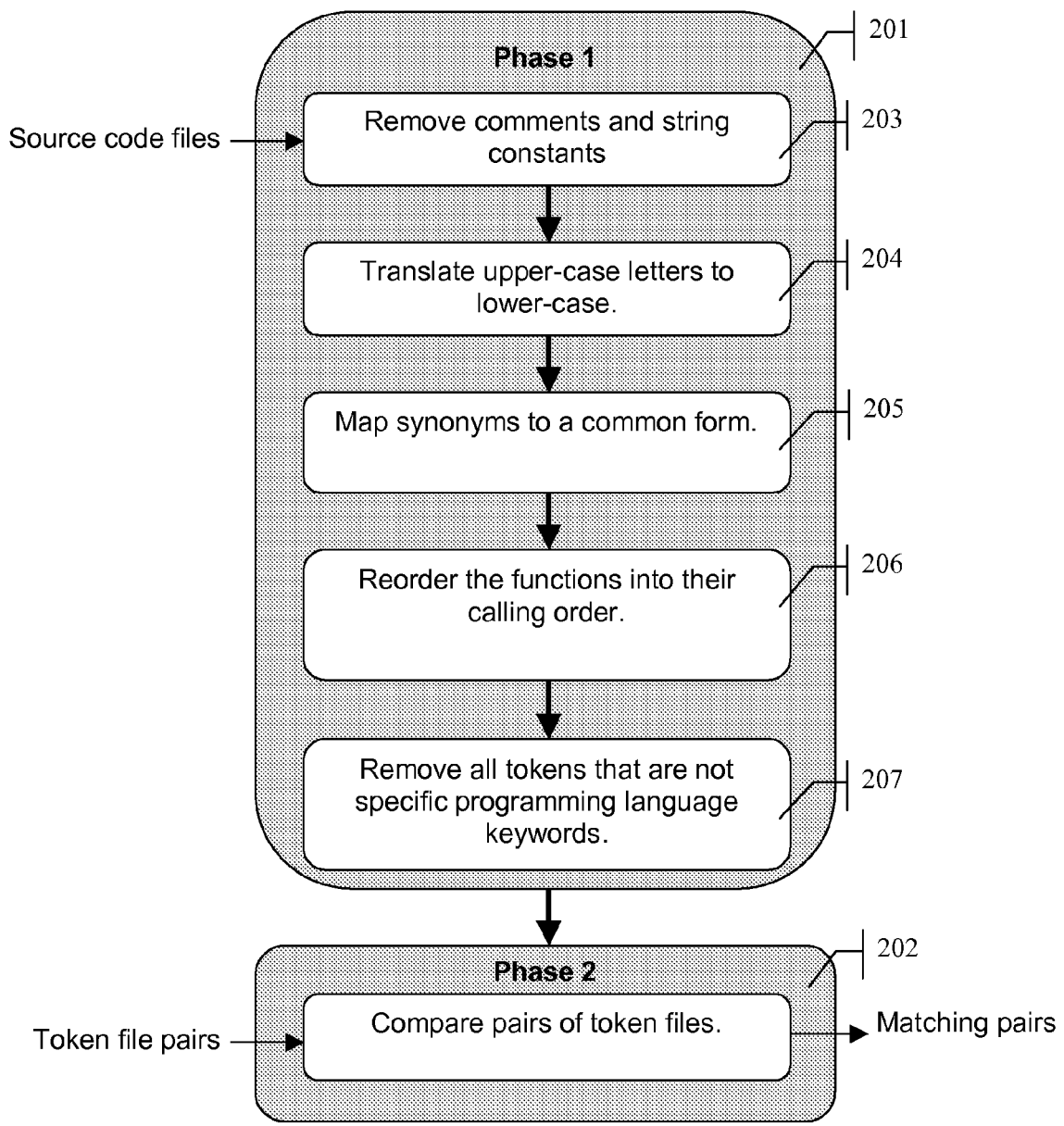
FIG. 2 illustrates the prior art algorithm used by the YAP, YAP2, and YAP3 programs for source code plagiarism detection.
Figure 3:
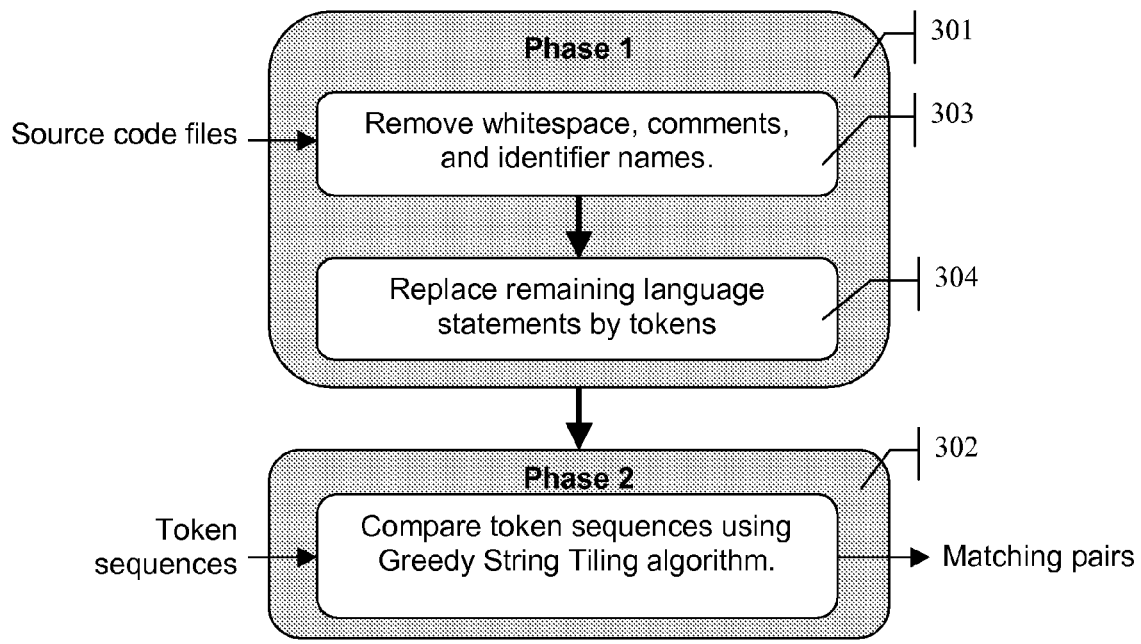
FIG. 3 illustrates the prior art algorithm used by the JPlag program for source code plagiarism detection.
Figure 4:
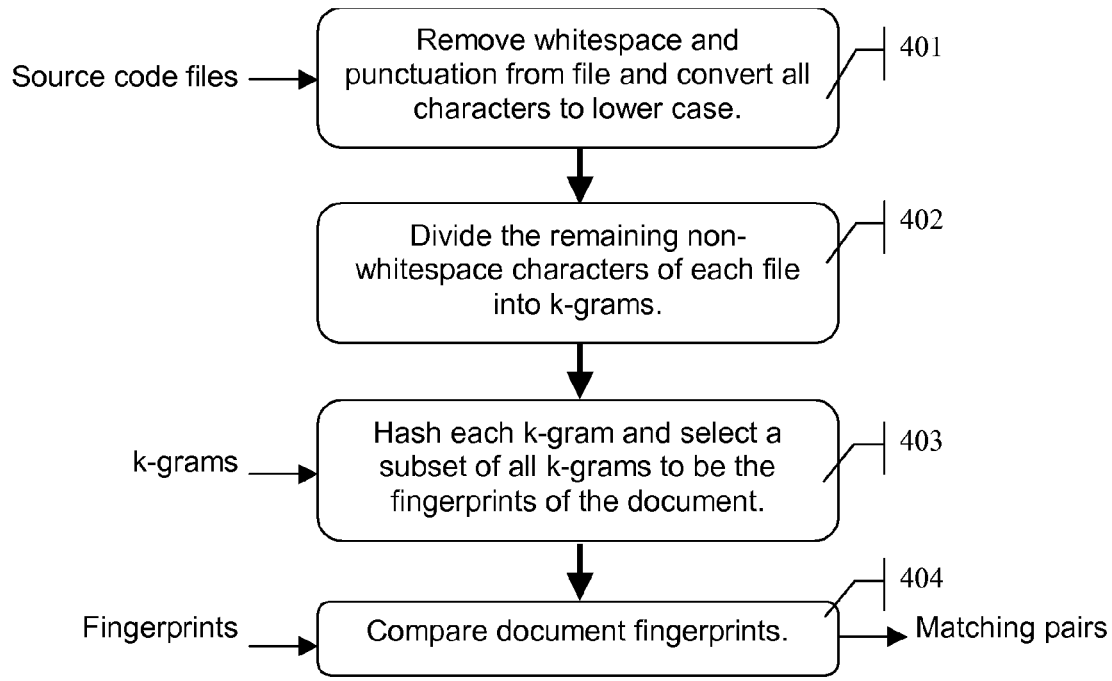
FIG. 4 illustrates the prior art algorithm used by the MOSS program for source code plagiarism detection.
Figure 7:
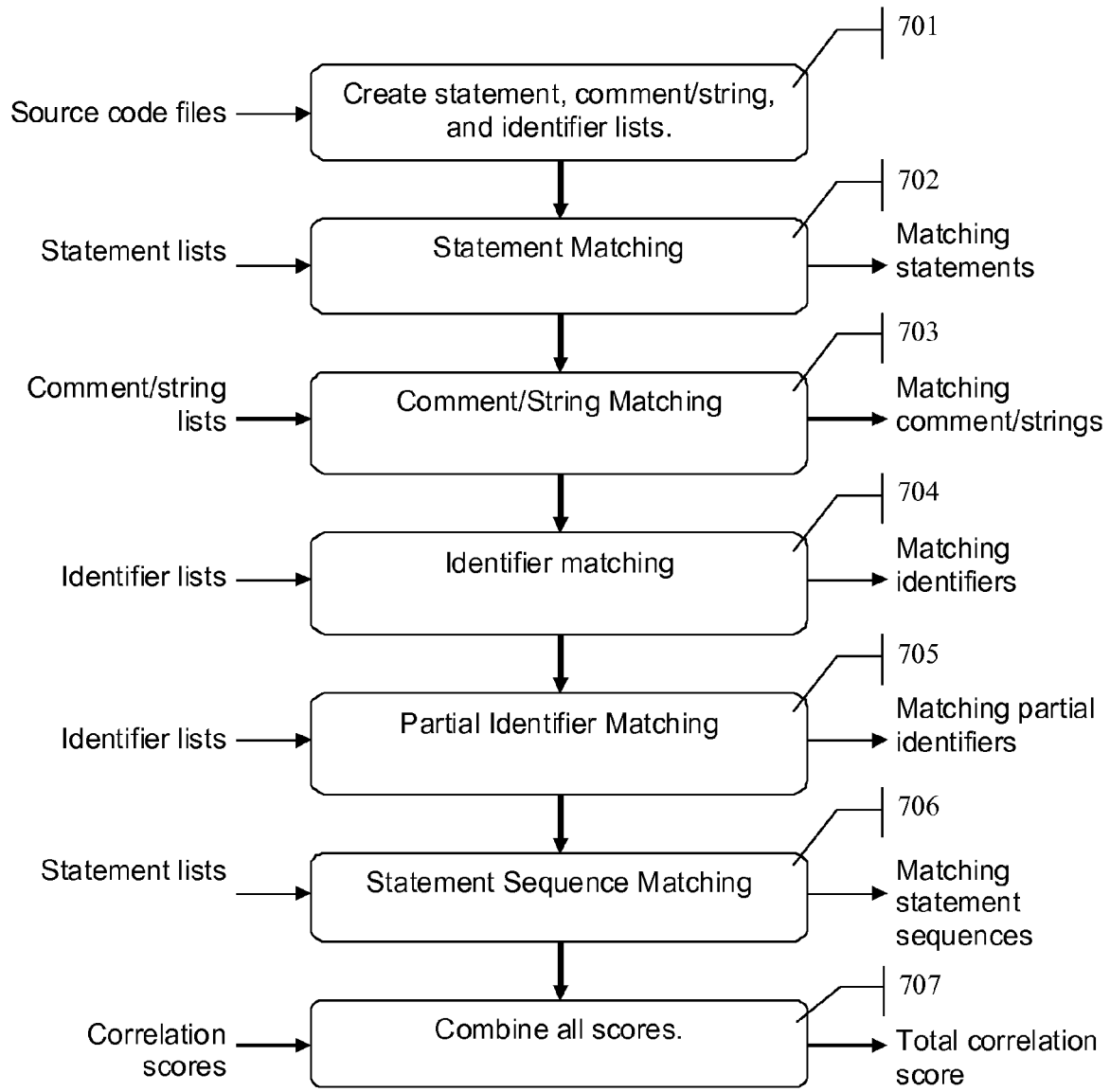
FIG. 7 illustrates the prior art sequence of algorithms used by the CodeMatch program for measuring source code correlation.

The present invention will be understood more fully from the detailed description given below and from the accompanying drawings of the preferred embodiment of the invention, which, however, should not be taken to limit the invention to the specific embodiment but are for explanation and understanding only.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "communicating", "executing", "passing", "determining", "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.), etc.

The present invention provides a way to determine whether common elements in a program are due to copying or not by examining these common elements and searching for them on the Internet. If two programs contain common elements that are due to the fact that both programs use third party code, these elements will most likely appear on the Internet. They may appear in code snippets or entire program source code that is made available as open source code. Proprietary code is still likely to be referenced in user guides, specifications, and discussions by programmers on various blogs and bulletin boards. Similarly if the common elements are from automatically generated code, are commonly used identifier names, or common algorithms there is a good chance reference to these elements will appear on the Internet. If the common elements are due to the fact that both programs had a common author, reference to the elements may still be found on the Internet if the author has other code samples available. If these common elements are rarely or never referenced on the Internet, there is a significant chance that the correlation of the programs is due to copying.

Figure 8:
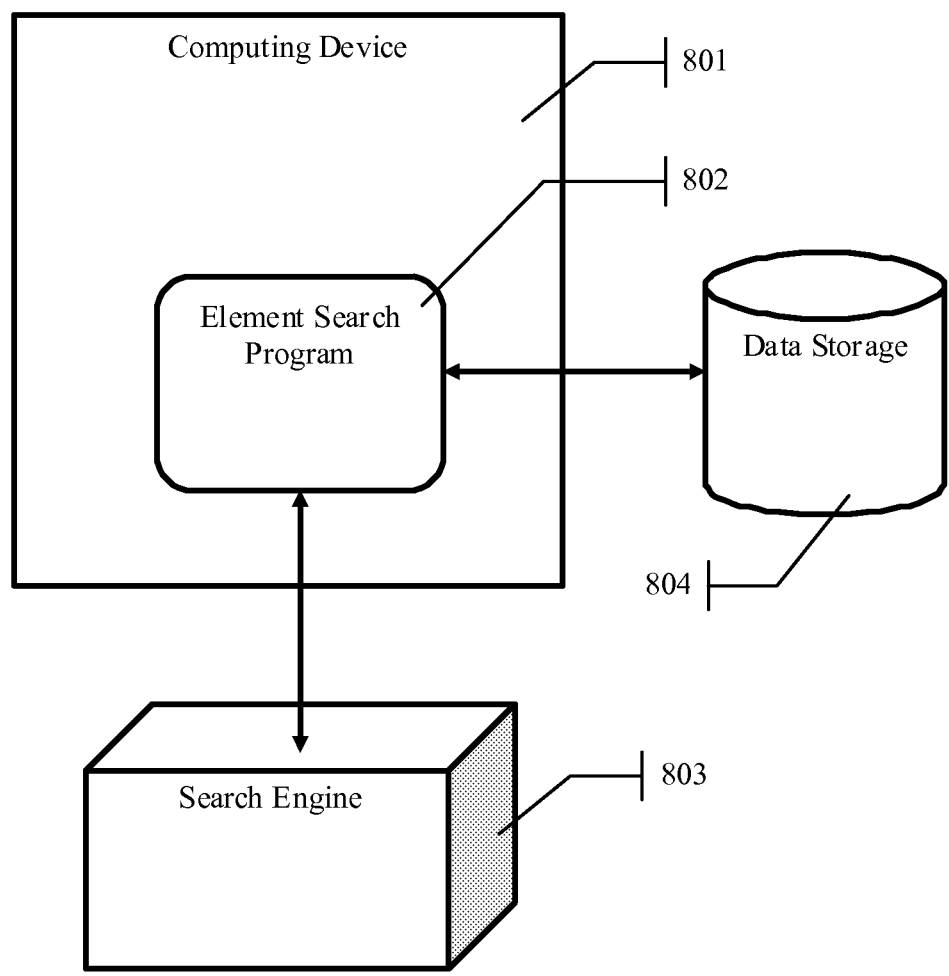
FIG. 8 illustrates a block diagram of a system for the present invention, in accordance with one embodiment of the invention.

A system for implementing one embodiment of the present invention is shown in FIG. 8. The system includes a computing device 801 and a data storage device 804. The data storage device 804 may be a mass storage device, such as a magnetic or optical storage based disk or tape, and may be part of the computing device 801, or be coupled with the computing device 801 directly or via a network, which may be a public network such as the Internet or a private network such as a local area network (LAN). The computing device 801 may be a personal computer (PC), palm-sized computing device, personal digital assistant (PDA), server, or other computing device.

The computer device 801 hosts the element search program 802, one embodiment of the present invention, that can be used to search the Internet for the number of times a pair of matching program elements is found, where the pairs of matching program elements are contained in a database. The database containing the pairs of matching program elements may be stored in the data storage device 804.

In one embodiment, the element search program 802 connects to a search engine 803 that has indexed a large number of pages on the Web and can search through them very quickly. The search engine 803 may be part of the computing device 801, or be coupled with the computing device 801 directly or via a network, which may be a public network such as the Internet or a private network such as a local area network (LAN).

Figure 9:
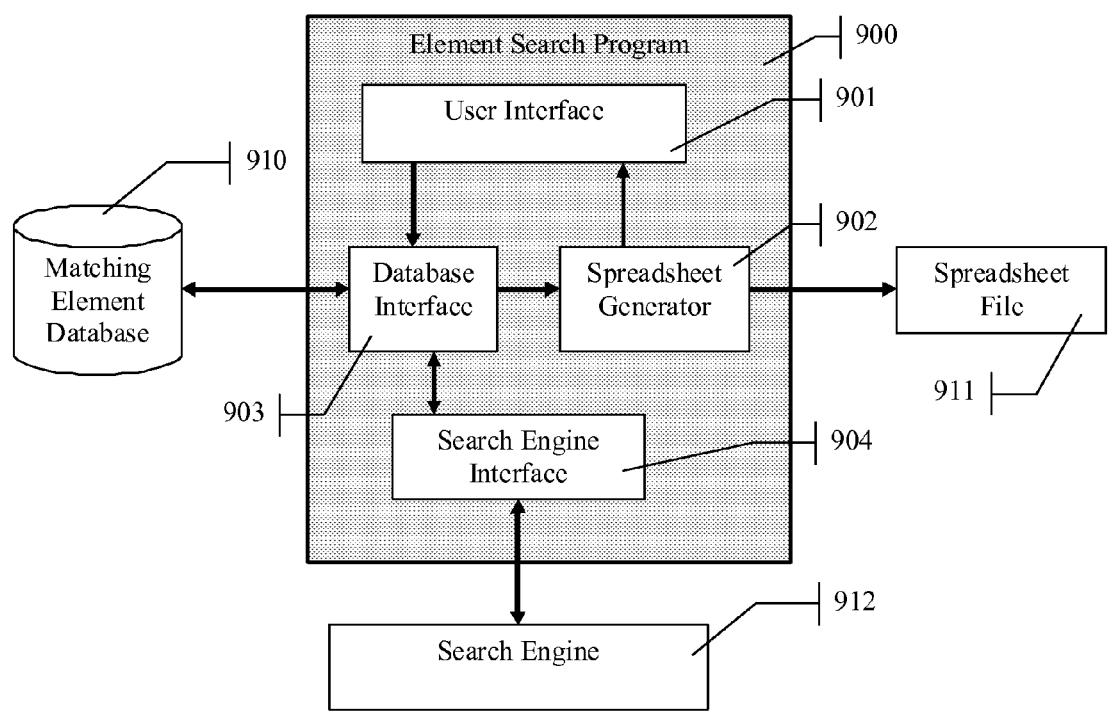
FIG. 9 illustrates the software architecture of one embodiment of the present invention.

The present invention takes a database that contains matching program elements found in the source code or object code of two different programs, then searches the Internet to determine the number of times these terms can be found in order to determine how common these terms are. FIG. 9 shows the software architecture of one embodiment of the present invention. The Element Search program 900 consists in very basic terms of the User Interface 901, the Spreadsheet Generator 902, the Database Interface 903, and the Search Engine Interface 904. The User Interface 901 allows the user of the program to enter information such as the name and location of the Matching Element Database 910 to examine, the types of program elements to examine, and the name and location of the resultant Spreadsheet File 911 to produce. The User Interface 901 also sends information back to the user such as a display of the resulting Spreadsheet File 911 as well as user instructions and error messages. The Database Interface 903 reads the Matching Element Database 910 and creates an alphabetically Sorted List of Program Elements 1000 as exemplified in FIG. 10. As Database Interface 903 reads each program element from the Matching Element Database 910, if the element is not already in the Sorted List of Program Elements 1000 the Database Interface 903 adds the element to the Sorted List of Program Elements 1000 in alphabetical order. If the element is already in the Sorted List of Program Elements 1000, the Database Interface 903 takes no action and reads the next element from the Matching Element Database 910.

When the Database Interface 903 has read each program element from the Matching Element Database 910 and created the Sorted List of Program Elements 1000, the Database Interface 903 reads each element from the Sorted List of Program Elements 1000 and sends each element to the Search Engine Interface 904. The Search Engine Interface 904 may wrap the program element in double quotation marks or perform any other necessary modifications required by the particular Search Engine 912, then sends the modified program element to Search Engine 912. The Search Engine 912 returns the number of "hits" (the number of times the term or expression was found on the Internet) for the program element and sends that number to the Database Interface 903, which inserts the hit value into a list of hit values that is index-matched to the Sorted List of Program Elements 1000.

The Search Engine 912 may be coupled with the Element Search Program 900 directly on the same computer or via a network, which may be a public network such as the Internet or a private network such as a local area network (LAN). The communication between the Element Search Program 900 and the Search Engine 912 is typically an application program interface (API) defined by the provider of the Search Engine 912. Examples of such Search Engines 912 are the Yahoo!® search engine (Yahoo! is a registered trademark of Yahoo! Inc.), the Google™ search engine (Google is a trademark of Google Inc.), and the Ask.com™ search engine (Ask.com is a trademark of IAC Search & Media), all accessible via the Internet. One example of the search engine API is the Yahoo! Search BOSS (Build your Own Search Service) from Yahoo! Inc.

After the Database Interface 903 has created the hit list, the Database Interface 903 reads each program element in the Matching Element Database 910 starting at the beginning, finds each read program element in the Sorted List of Program Elements 1000 and each corresponding hit value in the hit list, and inserts the hit values into the Matching Element Database 910. When the entire Matching Element Database 910 has been read, and the number of hits for each program element has been inserted into the Matching Element Database 910, the Database Interface 903 sends the lists to the Spreadsheet Generator 902, which creates a Spreadsheet File 911, illustrated in FIG. 11, that shows each program element and the number of hits. The Spreadsheet Generator 902 also sends the Spreadsheet File 911 to the User Interface 901 for displaying to the user.

Note that in this embodiment the entire Internet is searched by the Search Engine 912, not just an Internet database of source code. This is because some source code is licensed for a fee and would not appear in a database or for distribution on the Internet. However, we would expect that references to the code would be found in user's guides, articles, technical notes, and on message boards. Thus for our purposes a search of the entire Internet is more effective than a search of just source code on the Internet.

Figure 10:
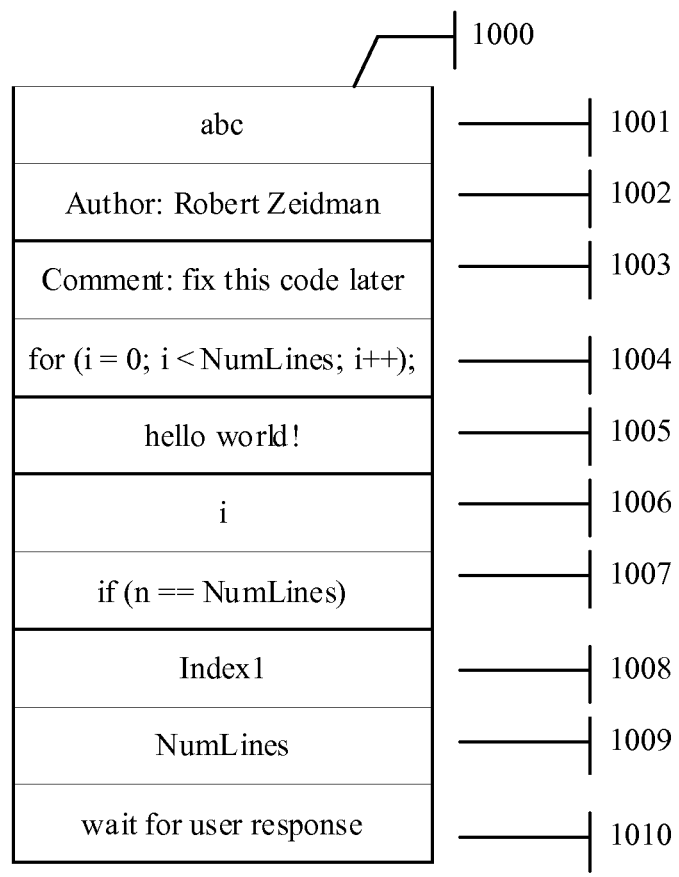
FIG. 10 illustrates an example of an alphabetically sorted list of statement program elements including statements, identifiers, comments, and strings, in accordance with one embodiment of the invention.

FIG. 10 shows an exemplary alphabetically Sorted List of Program Elements 1000. The elements 1001, 1006, 1008, and 1009 are identifiers, which include variable names, function names, constants, and other names used within a program. The elements 1002, 1003, and 1010 are comments that have no function within a program but are used to document the workings of the program. The elements 1004 and 1007 are statements that instruct a computer to perform operations. The element 1005 is a string that is a message displayed to a user.

FIG. 11 shows an exemplary spreadsheet 906. The header section 1101 includes a user-defined title ("Internet Search Results") and contains the date when the comparison of program elements was performed ("Run date", "12/23/2007") and the date when the spreadsheet was created ("Analysis date", "2/14/2008"). The title row 1102 shows that the left column of element section 1103 contains program elements that in the example are statement program elements. The title row 1102 also shows that the right column of element section 1103 contains the number of hits for each program element in the same row in the left column. The element section 1103 shows program elements sorted alphabetically in the left column and corresponding hits in the right column. The program elements can also be sorted numerically according to the hits in the right column. One skilled in the art will see other ways of labeling and organizing a spreadsheet to show program elements and hits.

The elements that have 0 hits can be determined to not be the result of third party source code, common identifier names, or common algorithms because if that were the case, these elements would show up elsewhere on the Internet. For elements that have a small number of hits, these hits can be examined manually by putting the program element into a search engine and visiting all of the sites where the program element occurs. It may turn out that the term shows up in some use other than as a program element, which would again be helpful for determining that the matching elements are not the result of third party source code, common identifier names, or common algorithms. The elements that have large number of hits are definitely common terms and can usually be explained as third party source code, common identifier names, or common algorithms rather than other reasons for correlation.

Figure 12:
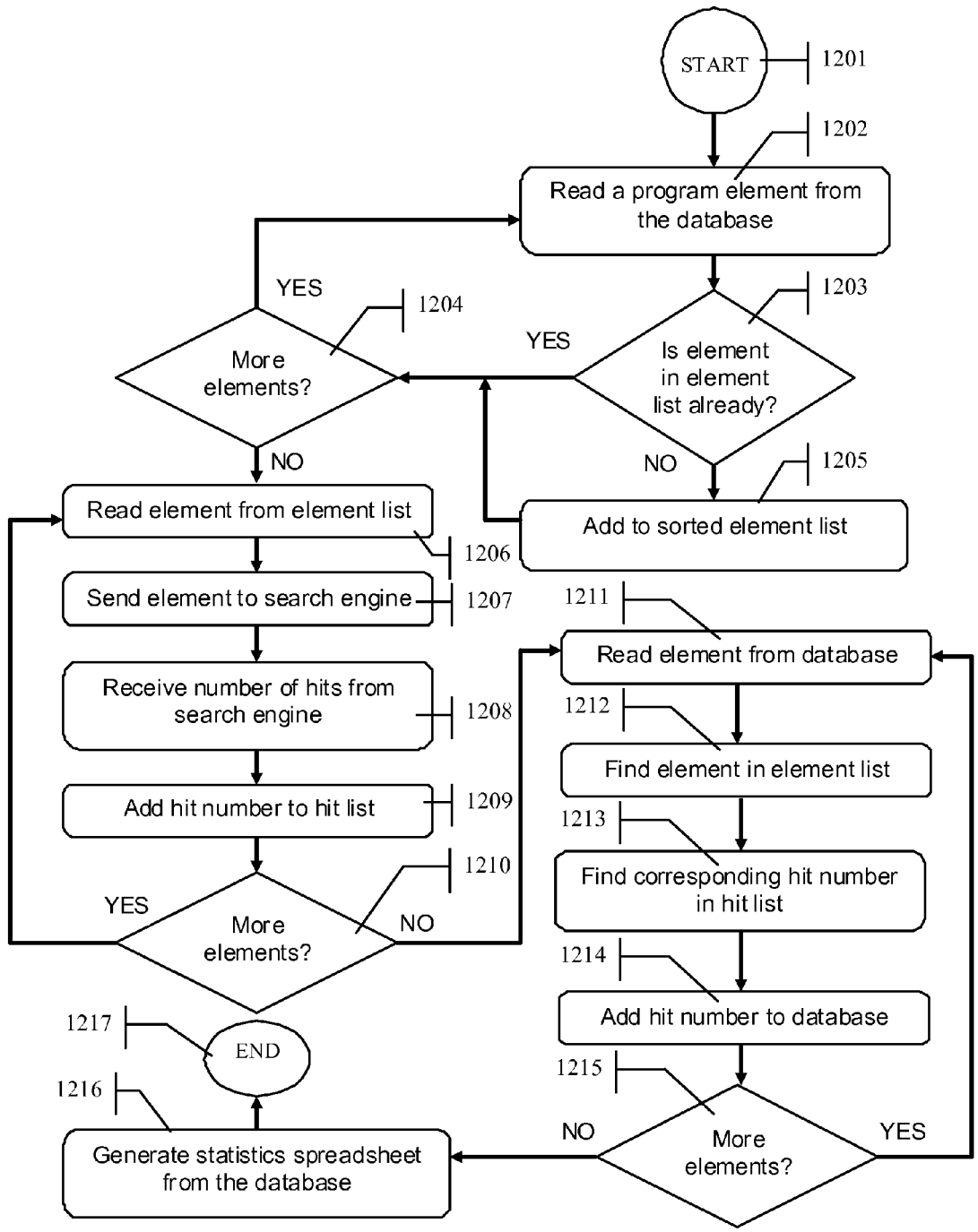
FIG. 12 illustrates the process of the present invention, in accordance with one embodiment of the invention.

The sequence of steps of one embodiment of the present invention is shown in FIG. 12. Starting at step 1201, upon initiation of the process by the user, the next step is 1202 where a program element is read from Matching Element Database 904. The next step is 1203 where it is determined whether the element read from the Matching Element Database 904 already exists in the Sorted List of Program Elements 1000. If the program element is not in the Sorted List of Program Elements 1000, it is added to the Sorted List of Program Elements 1000 in step 1205 and then step 1204 is performed. If the element is already in the Sorted List of Program Elements 1000, step 1205 is skipped and step 1204 is performed. At step 1204 it is determined whether more program elements exist in the Matching Element Database 904. If so, step 1202 and subsequent steps are repeated. If there are no more program elements to be read from the Matching Element Database 904, step 1206 is performed where a program element is read from the Sorted List of Program Elements 1000, starting at the beginning. The next step 1207 sends the program element to a search engine with any required modifications such as enclosing the element in quotation marks so that it is treated as a single entity to be searched. At the next step 1208 a number is received from the search engine representing the number of "hits" for this program element. At step 1209 this hit number is added to a list of hits that corresponds to the Sorted List of Program Elements 1000. For each element in the Sorted List of Program Elements 1000 there is a corresponding place in the hit list that represents the number of hits returned for that element. At step 1210 it is determined whether there are more elements in the Sorted List of Program Elements 1000. If so, step 1206 and subsequent steps are repeated. If there are no more elements in the Sorted List of Program Elements 1000, elements are once again read from the Matching Element Database 904, starting at the beginning, in step 1211. At step 1212, the program element read from the Matching Element Database 904 is found in the Sorted List of Program Elements 1000. At step 1213, the hit number corresponding to the program element read from the Matching Element Database 904 is found in the hit list. At step 1214, the hit number for the program element is added to the Matching Element Database 904. At step 1215 it is determined whether there are more program elements in the Matching Element Database 904. If so, step 1211 and subsequent steps are repeated. If there are no more program elements in the Matching Element Database 904, step 1216 generates a spreadsheet showing the program elements in the Sorted List of Program Elements 1000 and their corresponding hits. Finally step 1217 ends the process.

Figure 13:
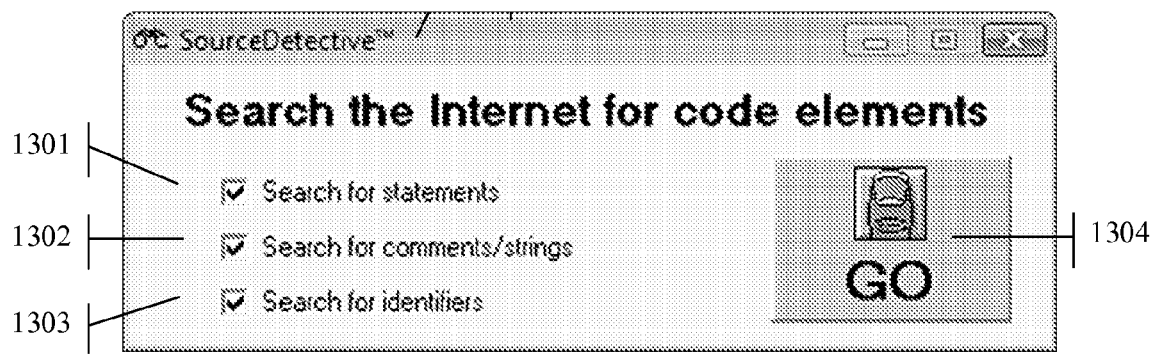
FIG. 13 illustrates a user interface of the present invention, in accordance with one embodiment of the invention.

FIG. 13 illustrates a user interface 1300 of the present invention, in accordance with one embodiment of the invention. Checkbox 1301 allows the user to select whether to search the Internet for statement program elements found in the Matching Element Database 904. Checkbox 1302 allows the user to select whether to search the Internet for comment program elements and string program elements found in the Matching Element Database 904. Checkbox 1303 allows the user to select whether to search the Internet for identifier program elements found in the Matching Element Database 904. When button 1304 is clicked, the search of the Internet for program elements in the Matching Element Database 904 begins as diagrammed in FIG. 12. One skilled in the art will see other ways of implementing a user interface for the present invention.

Figure 14:
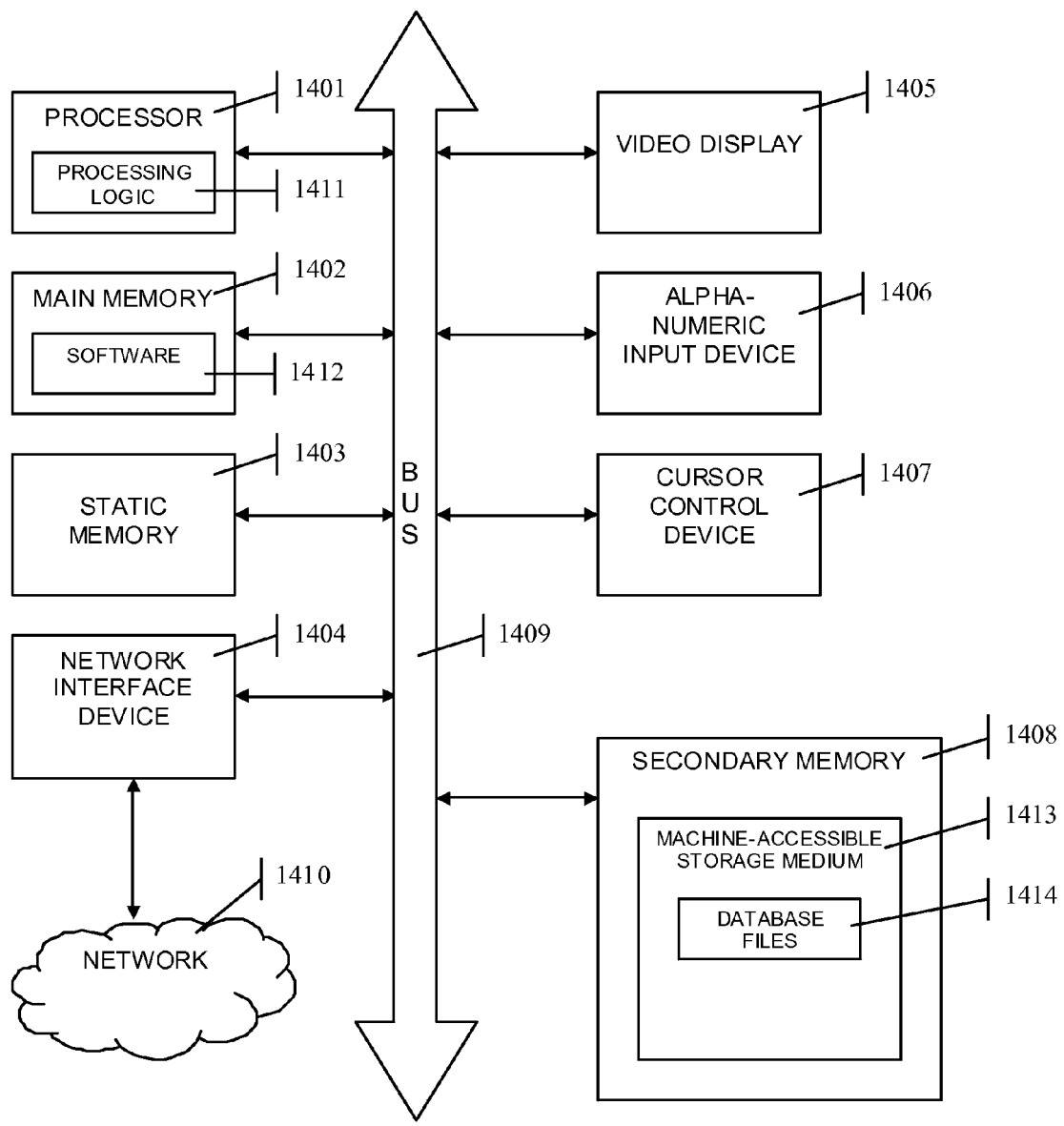
FIG. 14 illustrates a block diagram of an exemplary computer system, in accordance with one embodiment of the invention.

FIG. 14 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system includes a processor 1301, a main memory 1302 such as read-only memory (ROM), flash memory, dynamic random access memory (DRAM) including synchronous DRAM (SDRAM) or Rambus DRAM (RDRAM), etc., a static memory 1303 such as flash memory, static random access memory (SRAM), etc., and a static memory 1303 such as a data storage device, which communicate with each other via a bus 1309.

Processor 1301 represents one or more general-purpose processing devices such as a microprocessor, central processing unit, or the like. More particularly, the processor 1301 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1301 may also be one or more special-purpose processing devices such as an application specific integrated circuit (ASIC), a field programmable gate array (FPGA), a digital signal processor (DSP), network processor, or the like. Processor 1301 is configured to execute the processing logic 1311 for performing the operations and steps discussed herein.

The computer system may further include a network interface device 1304. The computer system also may include a video display unit 1305 such as a liquid crystal display (LCD) or a cathode ray tube (CRT), an alphanumeric input device 1306 such as a keyboard, and a cursor control device 1307 such as a mouse.

The secondary memory 1308 may include a machine-accessible storage medium (or more specifically a computer-accessible storage medium) 1313 on which is stored one or more sets of instructions embodying any one or more of the methodologies or functions described herein. The software 1312 may reside, completely or at least partially, within the main memory 1302 and/or within the processor 1301 during execution thereof by the computer system, the main memory 1302 and the processor 1301 also constituting machine-accessible storage media. The software 1312 may further be transmitted or received over a network 1310 via the network interface device 1304.

The machine-accessible storage medium 1313 may also be used to store database files 1314. While the machine-accessible storage medium 1313 is shown in an exemplary embodiment to be a single medium, the term "machine-accessible storage medium" should be taken to include a single medium or multiple media, such as a centralized or distributed database and/or associated caches and servers, that store the one or more sets of instructions. The term "machine-accessible storage medium" shall also be taken to include any medium that is capable of storing or encoding a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

While these embodiments describe searching for the number of occurrences of common program elements on the Internet in order to determine whether copying occurred, one skilled in the art will see that the methods and apparatuses described herein can be applied to searching for common elements of other kinds of things to determine whether copying occurred. For example, these methods and apparatuses can be used to search for common terms within term papers, novels, technical specifications, textbooks, musical compositions, etc. in order to determine whether copying has occurred.

Various modifications and adaptations of the operations that are described here would be apparent to those skilled in the art based on the above disclosure. Many variations and modifications within the scope of the invention are therefore possible. The present invention is set forth by the following claims.

We claim:

1. A computer-implemented method for detecting plagiarism between files, the method comprising:
    reading, by a computer system, an element from a matching element database, wherein the element in the matching element database is text that has been determined to exist in each of first and second files and an indication of a correlation between the first and second files;
    sending, by the computer system, said element that has been determined to exist in each of first and second files to a search engine, wherein the search engine searches a plurality of sources for one or more hits of said element with respect to the plurality of sources;
    receiving, by the computer system, from said search engine a number of the hits;
    displaying, by the computer system, to a user said element and said number of hits for said element as an indication of whether or not the correlation is due to plagiarism between the first and second files.

2. The method of claim 1 where sending said element to a search engine includes modifying said element before sending.

3. The method of claim 1 where sending said element to a search engine includes first placing said element into a sorted list.

4. The method of claim 1 where displaying to the user said element and said number of hits for said element comprises generating a spreadsheet with said element in one column and said number of hits for said element in the same row as said element and a different column as said element.

5. The method of claim 1 further comprising writing said number of hits to said database.

6. A non-transitory computer-readable storage medium storing executable instructions to cause a computer system to perform a method for detecting plagiarism between files, the method comprising:
    reading an element from a matching element database, wherein the element in the matching element database is text determined to exist in each of first and second files and an indication of a correlation between the first and second files;
    sending said element that has been determined to exist in each of first and second files to a search engine, wherein the search engine searches a plurality of sources for one or more hits of said element with respect to the plurality of sources;
    receiving from said search engine a number of the hits;
    displaying to a user said element and said number of hits for said element as an indication of whether or not the correlation is due to plagiarism between the first and second files.

7. The non-transitory computer-readable storage medium storing executable instructions to cause a computer system to perform the method of claim 6 where sending said element to a search engine includes modifying said element before sending.

8. The non-transitory computer-readable storage medium storing executable instructions to cause a computer system to perform the method of claim 6 where sending said element to a search engine includes first placing said element into a sorted list.

9. The non-transitory computer-readable storage medium storing executable instructions to cause a computer system to perform the method of claim 6 where displaying to the user said element and said number of hits for said element comprises generating a spreadsheet with said element in one column and said number of hits for said element in the same row as said element and a different column as said element.

10. The non-transitory computer-readable storage medium storing executable instructions to cause a computer system to perform the method of claim 6 further comprising computer-readable storage medium storing executable instructions to cause a computer system to write said number of hits to said database.

11. An apparatus for detecting plagiarism between files, the apparatus comprising:
    a memory; and
    a processor configured to
        read an element from a matching element database, wherein the element in the matching element database is text that has been determined to exist in each of first and second files and an indication of a correlation between the first and second files;
        send said element that has been determined to exist in each of first and second files to a search engine to search a plurality of sources for one or more hits of said element with respect to the plurality of sources;
        receive from said search engine a number of the hits; and
        display to a user said element and said number of hits for said element as an indication of whether or not the correlation is due to plagiarism between the first and second files.

12. The apparatus of claim 11 where said processor is configured to modify said element before sending.

13. The apparatus of claim 11 where said processor is configured to place said element into a sorted list before sending.

14. The apparatus of claim 11 further comprising a spreadsheet generator that generates a spreadsheet with said element in one column and said number of hits for said element in the same row as said element and a different column as said element.

15. The apparatus of claim 11 where said processor is configured to write said number of hits to said database.

\* \* \* \* \*